United States Patent [19]

Schaffeler et al.

[11] 3,970,807

[45] July 20, 1976

[54] ELECTRIC SWITCH HAVING A TIME-DELAY MECHANISM

[75] Inventors: Alois Schaffeler, Spaichingen; Wolfgang Moller, Schwenningen, both of Germany

[73] Assignee: J. & J. Marquardt, Germany

[22] Filed: Mar. 17, 1975

[21] Appl. No.: 558,652

[30] Foreign Application Priority Data

Mar. 22, 1974 Germany ............................ 2413786

[52] U.S. Cl. .................................................. 200/34

[51] Int. Cl.² ...................... H01H 7/03; H01H 43/00

[58] Field of Search ............................... 200/34, 339

[56] References Cited

UNITED STATES PATENTS

| | | | |
|---|---|---|---|
| 2,541,370 | 2/1951 | Koonz et al. | 200/34 X |
| 2,881,277 | 4/1959 | Marks et al. | 200/34 X |
| 3,411,310 | 11/1968 | Caldwell | 200/34 X |
| 3,681,721 | 8/1972 | Wessel et al. | 200/34 X |

*Primary Examiner*—James R. Scott
*Attorney, Agent, or Firm*—McGlew and Tuttle

[57] ABSTRACT

An electric switch which has a time-delay mechanism, comprises a housing with a fixed contact disposed in the path of swinging movement of a spring contact arm having a movable contact at its free end. A lever is pivotally mounted in the housing below the spring contact arm and it includes an extension which is engageable by the spring to pivot the lever during the movement of the spring after it is released to engage the movable contact with the fixed contact. The lever in turn acts upon one side of a diaphragm which covers a choke medium reservoir in the bottom of the housing and which acts on one end of a pivotal assembly of plates which is pivotal in the reservoir portion. The plate assembly interengages with a similar fixed plate assembly defined in the reservoir located within a liquid, such as an oil, and when the first set of plates pivots, the bottom portions of the plates move through passages containing the liquid choke medium so that the movement thereof is retarded in dependence upon the displacement of the medium.

7 Claims, 1 Drawing Figure

ELECTRIC SWITCH HAVING A TIME-DELAY MECHANISM

FIELD AND BACKGROUND OF THE INVENTION

This invention relates in general to the construction of electrical switches and, in particular, to a new and useful switch having a spring-biased contact arm which is moved under its biasing force to engage a movable contact thereon with a fixed contact and which, in so doing, must displace a retarding or delay mechanism before contact is made.

DESCRIPTION OF THE PRIOR ART

The present invention relates particularly to an electrical switch which includes a time-delay mechanism. Certain switching operations require a closing or opening of a pair or pairs of contacts wherein one opening is delayed relative to the actuation of the other or wherein, only a single opening is delyaed during the actuation of the switch. Electric switches of this type are generally known. One such switch includes a pushbutton or a similar mechanism which may be hand-operated to cause a springloaded switching mechanism to be released. However, the motion of the member carrying the movable contact, for example, the switch contact arm, is braked by a time-delay mechanism so that the complete switching operation takes a little more time than is usual in a switch of this kind having no time-delay mechanism. In the prior art, a time-delay mechanism comprises a space spanned by a diaphragm wherefrom, upon actuation of the switch, the air is blown out by means of the diaphragm and the switching mechanism set in motion which is completed only upon evacuation of the air through a constriction or nozzle. During the resetting of the switch, air is taken in from the outside. Experience has shown, however, that the blast opening or nozzle is very sensitive to dirt deposition and becomes clogged in the course of time. This leads to an extension of the delay time and, finally, to a blocking of the switching system completely.

SUMMARY OF THE INVENTION

The present invention provides an improved electric switch having delay means which operate with a constant switching delay time over long periods of time. The invention provides an electric switch in which a choke medium is arranged in a closed space within one or more throttling passages and during the actuation of the switch contact arm to move to a contact-making position, one or more members must be displaced in the passages so as to delay the movement of the contact arm. With the inventive arrangement, the choke medium is contained in an entirely closed space and fills the space completely. It is perfectly protected against becoming dirty and, in practice, no clogging of the throttling passages occurs. The throttling passages in the present case are advantageously defined by the interengagement of groups of spaced apart plate elements with one of the plate assemblies being pivotal relative to the other, so that a portion of the plate elements must pass between the space between two of the other plates and displace liquid medium therein in the throttling passage or passages to thereby brake the motion of the mobile parts of the switch.

In a praticulary preferred embodiment of the invention, a hydraulic and/or viscosity throttling arrangement is used. By selecting an appropriate choke medium, a constant viscosity through a large range of temperatures can be obtained and, thereby, within this temperature range, constant delay values can be assured. It is advisable to use a special oil, such as a silicone oil. The retardation effect is influenced both by the configuration of the throttling passage or passages and by the viscosity of the medium which is filled into the passaage and the influence of the viscosity may even be a predominant influence.

In a preferred arrangement, assemblies or gangs of plates arranged with portions in spaced parallel relationship are fitted to spaces between a similar gang or assembly of plates, and the plates of one gang do not necessarily contact the plates of the other, but their thicknesses approximately correspond to the spacing between the other plates. One of the plate assemblies is mounted for pivotal movement, and the other is fixed in the reservoir of the liquid medium which is displaced by the movement. In a simple form, the two gang plate assemblies may have the same shape and dimensions.

In accordance with a preferred arrangement, the plates of each gang plate assembly are formed of approximately C-shape configuration and an upper gang assembly is arranged to interengage in the space between a lower fixed plate assembly arranged in a tub or reservoir containing a liquid which is displaced during movement of the upper plate assembly. In addition, the upper plate assembly is covered by a diaphragm which bears on each end and, in the set position, one end bears against a lever which is contacted by the contact arm of the spring when it moves to a contact-making position. The opposite end of the movable plate assembly is covered by a diaphragm which engages against a spring of a tappet member which may be displaced by a setting lever downwardly to set the parts in position by causing the opposite end of the plate assembly to engage against the lever and to raise the switch back to a condition at which it may be held in a setting position prior to actuation. When the switch is actuated, the switch contact arm acts on the lever to displace it, to cause the lever, in turn, to act on the diaphragm and one end of the pivotal plate assemblies to force portions thereof to displace the throttling medium in the reservoir between plates of the other contact plate assembly. This action causes the delay of movement of the switch contact arm into the contact-making position. For resetting, all of these movable parts are angularly displaced in an opposite direction. The resetting mechanism includes a pivotal lever member which engages the tappet which acts on one end of the diaphragm through a compression spring and in turn acts on one end of the plate assemblies to force the opposite end to return the lever and the contact arm to an initial set position.

The resetting mechanism rests against a diaphragm through the action of a compression spring and, preferably, a helical compression spring. Prior to the release of the switching operation, the spring is slightly biased so that not only the associated portion of the diaphragm, but also the respective other end of the pivotal gang plate member positioned beneath this diaphragm portion, is held down. This ensures that, even in the initial or rest position in which the gang plate member extends obliquely to the horizontal, a levelling of the member, due to the gravity, is prevented. Thus, at the same time, the resetting mechanism serves as a detent for the switch delay mechanism.

According to another feature of the invention, the other end of the compression spring, distant from the diaphragm, rests against a tappet whose other end applies or is adapted to apply against a swing arm of the switch mechanism. Thus, upon actuation of the switch, both the contact arm carrying the movable contact and the tappet are released at the same time. Inversely, at the resetting of the switch, the tappet is displaced against the action of the spring and the entire switching mechanism is brought back into its initial position, against the force of the switch spring. It is possible, of course, to omit the tappet and to have the swing arm applied or applicable directly against the compression spring. Further, instead of a swing arm, another member permitting the same movements, for example, a sliding member having an inclined surface, may be used. In particular, however, it is provided that the swing arm is formed by one of the lever arms of a rocker-type switch. Such a rocker can be used, at the same time, for releasing the switching mechanism, i.e., the contact arm or the like. In a useful manner, the contact arm of the delay switch is connected to or forms a part of a snap-action mechanism, i.e., in principle, the mechanism becomes a snap switch which, however, due to the delay mechanism, cannot snap and is rather comparable to a key. Such a design is particularly important if, in accordance with a further feature of the invention, the switch comprises at least two conjointly actuable contact arms or the like of which only one is movable into the closed switch position with delay. Upon actuation of such a two- or multiple-pole switch, two or more pairs of contacts are closed abruptly while the remaining pair or pairs of contacts come to a closure only after a delay. Such a switch is particularly important in a three-pole design, in view of its special use for switching electromotors. For other purposes, it is also possible to provide a snap action only for one of the contact pairs and to design two or more with a time delay. Also possible is to design the pairs of contacts with different time delays in succession.

Accordingly, it is an object of the invention to provide an improved switch construction, which includes a movable contact on a spring contact arm which is biased to move to engage the movable contact with a fixed contact and which includes a delay mechanism operated by the movement of this arm which comprises at least one plate member being pivotally mounted and displaceable with a portion thereof moving through a choke passage defined by another plate member so as to retard the movement of the contact arm to an actuated position.

A further object of the invention is to provide an electrical contact switch which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

FIG. 2 is a section taken along the line 2—2 of FIG. 1.

DESCRIPTION OF THE PREFERRED EMBODIMENT

Figure 1:
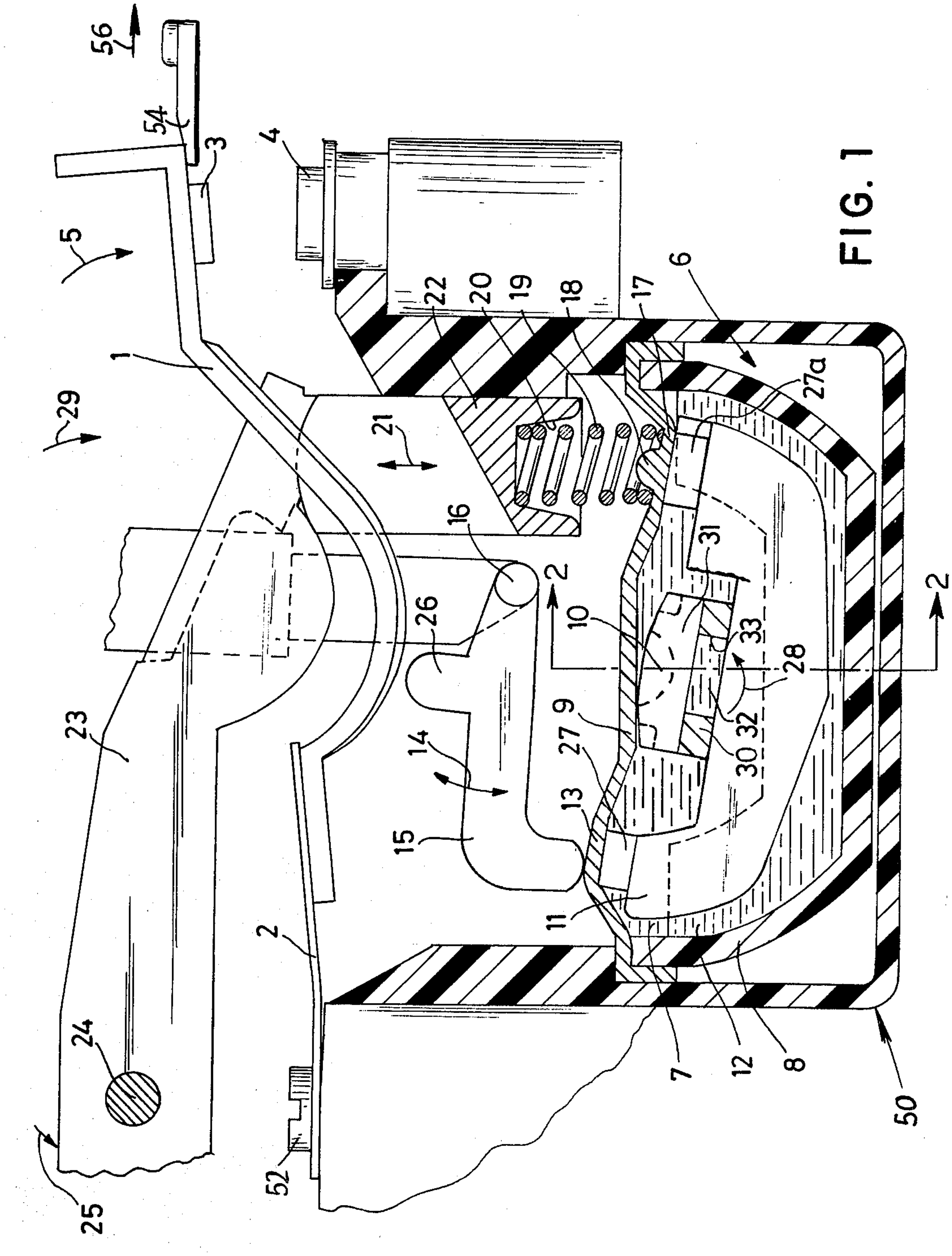
FIG. 1 is a transverse sectional view of a switch constructed in accordance with the invention.

Referring to the drawing in particular, the invention embodied therein, comprises a switch having a time-delay mechanism and which includes a switch housing 50 having a movable contact or contact arm 1 which is mounted on the housing by means, such as a loading spring 2, which biases it to move in the direction of the arrow 5 to engage a movable contact 3 on the contact arm with a fixed contact 4 carried on the housing. The loading spring 2 is advantageously secured on the housing by a bolt 52.

In accordance with the invention, delay means are associated with the contact arm and set in action by the movement of the arm in a direction of the arrow 5 to delay the movement of the arm during the switch actuation. In the non-actuated position in which the switch is set, as shown in the drawing, the contact arm 1 is held by a holding mechanism or button 54 which may be shifted in the direction of the arrow 56 in order to actuate the switch.

When this occurs, the contact arm 1 contacts an upstanding extension 26 of a lever 15 which is pivoted on a pivot pin 16 in the housing 50. The lever 15 may move in either direction as indicated by the double arrow 14 and its lower end is normally in contact with an upwardly formed portion 13 of a diaphragm 9 which is supported in the housing for pivotal movement over the top of a tub or reservoir 8 for a throttling medium. The diaphragm 9 covers a first pressure plate assembly of a plurality of spaced apart plates 11 of C-shape configuration which interengage in the spaces of equally spaced apart plates of a second assembly 12. The second assembly of plates 12 is fixed in the bottom of the tub 8 and the first assembly of plates 11 is pivotally supported in the tub by pivot pin elements 32 which are arranged at each end of a cover strip 31 which extends across a flat central position of the plate assembly. The top of the cover strip is recessed in order to provide a pivot support of a pin 10 carried by the diaphragm 9. A pressure plate 27 on the plate assembly 11 bears upwardly into the convex portion 13 of the diaphragm 9. The opposite side of the plate assembly 11 carries an upward pressure plate or extension 27*a* which bears against the underside of a part 17 located on the opposite side of the pivot 10 from the part 13. Part 17 includes an upwardly extending raised portion which provides a centering means for a compression spring 19 which is arranged between it and a central recess 20 of a tappet 22. Tappet 22 is movable either upwardly or downwardly in a direction of the double arrow 21 and it is displaced downwardly by a swing arm portion 23 of a release key 25 which is pivoted at 24 above the housing. Release key 25 is actuated to shift tappet 22 downwardly when the mechanism is to be reset by forcing portion 17 to pivot downwardly and the portion 13 to pivot upwardly and to thus cause lever 15 to raise arm 1 up to a position at which it may be held in the reset position by reset button 54. Fixing pins 32 are also engaged in bores 33 of the connection strip 30 and apply against the inner surface of the diaphragm 9.

The interspaces between the assembly of plates 12 are filled with the throttling medium, such as oil, which occupies an oil space 7 within the tub 8 which is completely covered by diaphragm 9. The pivotal movement of assembly 11 in the direction of arrow 28 results in a displacement of the medium from the spaces between the plates 12 into which the lower portions of the plate assembly 11 moves. On the other side, the displaced medium can penetrate into portions of interspaces which have become free due to the angular motion of plates 11. Depending on the viscosity of the used medium, such as oil, and the chosen geometry of the passages formed between the plates and on the force of the loading spring 2, the closing motion of the contact arm may be accurately delayed by the delay mechanism, which is generally designated 6. The viscosity of the medium is a very important factor in this connection. When the movable contact 3 contacts fixed contact 4, no further force acts on the intermediate lever 15 so that the pivotal movement of plate member 11 is terminated. In this actuated position, plate assembly 11 will be raised on the end 27*a* and the tappet 22 will be lifted into its uppermost position in order to relieve spring 19. With contacts 3 and 4 closed, the swing arm 23 does not apply against the tappet 22. The intermediate lever 15 can be brought back into its initial position by the reset mechanism, including the release key 25, and may be locked by means of the backswitching mechanism. A snap acting mechanism, such as used in snap switches of the conventional design, may be provided for the movable parts including the release key 25.

The switch delay mechanism of the inventive switch has the advantage of low manufacturing and assembly costs, constant delay values and rugged construction, as well as of minimum susceptibility to disturbances. A dirtying is practically impossible because there is no abrasion between the plates and, from the outside, the dirt cannot be introduced due to the closed design of space 7. In its initial position, the contact arm need not necessarily apply against extension 26 of intermediate lever 15. In such a case where intermediate lever is not backed, the extreme end position of gang plate member 11 is ensured so that, prior to the switching, portion 17 of the diaphragm 9 applies simultaneously against the righthand end of gang plate member 11, and the righthand end of fixed gang plate member 12. Further advantages of the inventive switch are, in addition, a rapid increase of the contact force at the end of the closing operation and obtainable high switching forces.

The plates assemblies 11 and 12 do not necessarily have to be C-shape, and their height may also be uniform or approximately uniform.

While a specific embodiment of the invention has been shown and described in detail to illustrate the application of the principles of the invention, it will be understood that the invention may be embodied otherwise without departing from such principles.

What is claimed is:

1. An electric switch, comprising a housing, a fixed contact on said housing, a contact arm adjacent said fixed contact having a free end with a movable contact and an opposite end mounted on said housing, said free end of said arm with said movable contact being biased in a direction toward said fixed contact for engagement of said movable contact with said fixed contact, a lever pivotally mounted on said housing below said contact arm and being displaced by contact of said arm and movement of said arm toward said fixed contact, a liquid choke medium reservoir in said housing below said lever, second plate means defining at least one choke medium passage in said reservoir, first plate means pivotally mounted in said housing below said lever and having a first end portion operatively associated with said lever so as to be pivotally displaceable by movement of said lever and having a second end portion on the opposite side of said pivot movable in an opposite direction and also having a movement delay part in the choke medium passage acting on the medium so as to delay the movement of said first plate means and hence the closing movement of said contact arm.

2. An electric switch, according to claim 1, wherein said first and second plate means each comprise a plurality of laminated plates arranged with their lower portions in spaced parallel relationship with the plates of the second plate means being located in the spaces between the plates of the first plate means.

3. An electric switch, according to claim 1, wherein said first plate means and said second plate means are of substantially C-shape configuration, said second plate means being fixed in the bottom of said reservoir, said first plate means having a cover extending across the top thereof and having bottom portions engaged between the plates of said second plate means, a diaphragm pivotally mounted on said cover portion to overlie said plates and cover said reservoir.

4. An electric switch, according to claim 1, wherein said lever includes an intermediate upstanding portion disposed below said contact arm, means for setting said contact arm in a position in which it extends above said fixed contact, said contact arm including a resilient plate portion biasing said arm to move it toward said fixed contact.

5. An electric switch, according to claim 4, including a resetting mechanism comprising a pivotal lever, a tappet movable upwardly and downwardly in said housing against the side of said first plate means to urge said side of said first plate means downwardly and urge the opposite side upwardly against said lever to lift said spring arm to a reset position.

6. An electric switch, according to claim 1, including a tappet mounted in said housing for movement upwardly and downwardly, and a compression spring disposed between said tappet and said second end portion of said first plate means, and means engageable with said tappet to compress said spring and to pivot said first plate means to an initial position and to return said contact arm to a preset position.

7. An electric switch, according to claim 6, wherein said means to move said tappet comprises a pivotal switching lever having a rocker arm portion engageable over said tappet.

* * * * *